US012763229B2

(12) United States Patent
Bernstein et al.

(10) Patent No.: US 12,763,229 B2
(45) Date of Patent: Oct. 13, 2026

(54) SYSTEMS AND METHODS FOR PRODUCING ACTINIUM-225

(71) Applicant: The Regents of the University of California, Oakland, CA (US)

(72) Inventors: Lee Bernstein, Berkeley, CA (US); Jon Batchelder, Richmond, CA (US); Jonathan T. Morrell, Albany, CA (US); Andrew Voyles, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 422 days.

(21) Appl. No.: 17/602,056

(22) PCT Filed: Apr. 6, 2020

(86) PCT No.: PCT/US2020/026837
§ 371 (c)(1),
(2) Date: Oct. 7, 2021

(87) PCT Pub. No.: WO2020/210147
PCT Pub. Date: Oct. 15, 2020

(65) Prior Publication Data
US 2022/0199276 A1 Jun. 23, 2022

Related U.S. Application Data

(60) Provisional application No. 62/830,687, filed on Apr. 8, 2019.

(51) Int. Cl.
*G21G 1/06* (2006.01)
*G21G 1/00* (2006.01)

(52) U.S. Cl.
CPC ............... *G21G 1/06* (2013.01); *G21G 1/001* (2013.01); *G21G 2001/0089* (2013.01)

(58) Field of Classification Search
CPC .... G21G 1/06; G21G 1/04; G21G 2001/0089; G21G 4/02; H05H 3/06
See application file for complete search history.

(56) References Cited

U.S. PATENT DOCUMENTS 5,784,423 A * 7/1998 Lidsky ..................... G21G 1/10 376/156
8,450,629 B2 5/2013 Pitcher
(Continued)

FOREIGN PATENT DOCUMENTS

EP 752710 A1 1/1997
JP H05506093 A 9/1993
(Continued)

OTHER PUBLICATIONS

Leung, Ka-Ngo, James K. Leung, and Graeme Melville. "Feasibility study on medical isotope production using a compact neutron generator." Applied Radiation and Isotopes 137 (2018): 23-27. (Year: 2018).*
(Continued)

*Primary Examiner* — Sharon M Davis
(74) *Attorney, Agent, or Firm* — Womble Bond Dickinson (US) LLP

(57) ABSTRACT

This disclosure provides systems, methods, and apparatus related to the production of actinium-225. In one aspect, a target is irradiated with a beam of deuterons to generate a beam of neutrons. A radium-226 target is irradiated with the beam of neutrons to generate radium-225.

19 Claims, 6 Drawing Sheets

(56) References Cited

U.S. PATENT DOCUMENTS

| | | | | |
|---|---|---|---|---|
| 9,058,908 | B2 | 6/2015 | Zhuikov et al. | |
| 2002/0094056 | A1 | 7/2002 | Satz et al. | |
| 2005/0105666 | A1 | 5/2005 | Mirzadeh et al. | |
| 2007/0092051 | A1 | 4/2007 | Adelman | |
| 2007/0297554 | A1 | 12/2007 | Lavie et al. | |
| 2009/0191122 | A1* | 7/2009 | Moreno Bermudez | A61P 35/02 424/1.61 |
| 2011/0006186 | A1* | 1/2011 | Allen | G21G 1/02 250/493.1 |
| 2011/0176648 | A1* | 7/2011 | Rowland | H05H 3/06 376/114 |
| 2017/0169908 | A1* | 6/2017 | Andrighetto | G21G 1/001 |
| 2018/0308698 | A1* | 10/2018 | Bina | C30B 31/20 |
| 2018/0322973 | A1* | 11/2018 | Fisher | G21G 1/001 |
| 2020/0082956 | A1* | 3/2020 | Brown | C22B 3/42 |
| 2020/0126683 | A1* | 4/2020 | Maciocco | G21G 1/06 |

FOREIGN PATENT DOCUMENTS

| | | | |
|---|---|---|---|
| JP | 2009527731 | A | 7/2009 |
| JP | 5522564 | | 6/2014 |
| JP | 2016136499 | A | 7/2016 |
| JP | 2020169873 | A | 10/2020 |
| WO | 2016037656 | A1 | 3/2016 |

OTHER PUBLICATIONS

Abbas, Kamel, et al. "Development of an accelerator driven neutron activator for medical radioisotope production." Nuclear Instruments and Methods in Physics Research Section A: Accelerators, Spectrometers, Detectors and Associated Equipment 601.3 (2009): 223-228. (Year: 2009).*

Belymam, A., et al. "Measurements of the neutron yield and the neutron energy distribution from the 9Be (d, n) 10B reaction . . . " Nuclear Instruments and Methods in Physics Research Section B: Beam Interactions with Materials and Atoms 134.2 (1998): 217-223. (Year: 1998).*

Melville, G., and P. Melville. "A theoretical model for the production of Ac-225 for cancer therapy by neutron capture transmutation of Ra-226." Applied Radiation and Isotopes 72 (2013): 152-157. (Year: 2013).*

Saltmarsh, M. J., and J. A. Horak. Large-volume intense neutron source for CTR materials studies. No. CONF-750723-9. Oak Ridge National Lab., Tenn.(USA), 1975. (Year: 1975).*

Coor, T., et al. "Nuclear cross sections for 1.4-Bev neutrons." Physical Review 98.5 (1955): 1369. (Year: 1955).*

Nethaway, D. R., R. A. Van Konynenburg, and T. M. Adams. Measurement of the neutron spectrum from the reaction of 30-MeV deuterons on a thick beryllium target. No. UCRL-52024. Lawrence Livermore National Lab.(LLNL), Livermore, CA (United States), 1976. (Year: 1976).*

International Search Report mailed on Jun. 25, 2020 for International Application No. PCT/US2020/026837.

Apostolidis et al., "Cyclotron production of Ac-225 for targeted alpha therapy," Applied Radiation and Isotopes vol. 62, No. 3, pp. 383-387, (Mar. 2005).

Boll et al., "Production of actinium-225 for alpha particle mediated radioimmunotherapy," Applied Radiation and Isotopes, vol. 62, No. 5, pp. 667-679, (May 2005).

Engle et al., "Ac, La, and Ce radioimpurities in 225Ac produced in 40-200 MeV proton irradiations of thorium," Journal of Radiochimica Acta, vol. 102, No. 7, pp. 569-581, (2014).

Guerard et al., "Production of [211At]-Astatinated Radiopharmaceuticals and Applications in Targeted α-Particle Therapy," Cancer Biotherapy & Radiopharmaceuticals, vol. 28, No. 1, (Jan. 9, 2013).

Griswold et al., "Large scale accelerator production of 225Ac: Effective cross sections for 78-192 MeV protons incident on 232Th targets," Applied Radiation and Isotopes, vol. 118, p. 366-374, (Dec. 2016).

Makvandi et al., "Alpha-Emitters and Targeted Alpha Therapy in Oncology: from Basic Science to Clinical Investigations," Targeted Oncology, vol. 13, pp. 189-203, (Feb. 8, 2018).

Spahn et al., "Enhanced production possibility of the therapeutic radionuclides 64Cu, 67Cu and 89Sr via (n,p) reactions induced by fast spectral neutrons," Journal of Radiochimica Acta, vol. 92, pp. 183-186, (2004).

Al-Abyad et al., "Nuclear data for production of the therapeutic radionuclides 32P, 64Cu, 67Cu, 89Sr, 90Y and 153Sm via the (n,p) reaction: Evaluation of excitation function and its validation via integral cross-section measurement using a 14 MeV d(Be) neutron source," Applied Radiation and Isotopes, vol. 64, No. 6, pp. 717-724, (Jun. 2006).

Bernstein et al., "Nuclear Data Needs and Capabilities for Applications," Lawrence Berkeley National Laboratory, (May 27-29, 2015).

Qaim et al., "Nuclear Data for Medical Radionuclide Production: Present Status and Future Needs" given at NONCA—http://bang.berkeley.edu/wp-content/uploads/NDNCA Berkeley-2015 Qaim.pdf.

Meulders et al., "Fast neutron yields and spectra from targets of varying atomic number bombarded with deuterons from 16 to 50 MeV (for radiobiology and radiotherapy)," Physics in Medicine & Biology, vol. 20, No. 2, pp. 235-243. (1975).

Harrig et al., "Nuclear Instruments and Methods in Physics Research Section A: Accelerators, Spectrometers, Detectors and Associated Equipment," Nuclear Inst. and Methods in Physics Research, A, vol. 877, No. 1, pp. 359-366, (Jan. 2018).

Robertson et al., "Development of 225Ac Radiopharmaceuticals: TRIUMF Perspectives and Experiences," Current Radiopharmaceuticals, vol. 11, No. 3, pp. 156-172, (2018).

Abergel et al., "Actinium Biokinetics and Dosimetry: What is the Impact of Ac-227 in Accelerator-Produced Ac-2257," Journal of Medical Imaging and Radiation Sciences, vol. 50, No. 4, Supplement 1, p. S93, (Dec. 2019).

Melville et al., "Production of Ac-225 for cancer therapy by photon-induced transmutation of Ra-226," Applied Radiation and Isotopes, vol. 65, No. 9, pp. 1014-1022, (Sep. 2007).

Diamond et al., "Actinium-225 production with an electron accelerator," Journal of Applied Physics, vol. 129, No. 10, pp. 104901-1 thru 104901-19, (Mar. 9, 2021).

Covo et al., "The 88-Inch Cyclotron: A one-stop facility for electronics radiation and detector testing," Measurement vol. 127, pp. 580-587, (Oct. 2018).

O'Connor et al., "Cross-sections for the reactions 226Ra(n,2n)225Ra and 226Ra(n,3n)224Ra with 14•5 MeV neutrons," Journal of Inorganic and Nuclear Chemistry, vol. 13, No. 1-2, pp. 5-12, (Apr. 1960).

McAlister et al., "Selective separation of radium and actinium from bulk thorium target material on strong acid cation exchange resin from sulfate media," Applied Radiation and Isotopes, vol. 140, pp. 18-23, (Oct. 2018).

Mastren et al., "Simultaneous Separation of Actinium and Radium Isotopes from a Proton Irradiated Thorium Matrix," Scientific Reports, vol. 7, No. 1, pp. 1-7, (Aug. 15, 2017).

Deblonde et al., "Ultra-selective ligand-driven separation of strategic actinides," Nature Communications, vol. 10, No. 1, pp. 1-9, (2019).

Fitzsimmons et al., "Optimization of Cation Exchange for the Separation of Actinium-225 from Radioactive Thorium, Radium-223 and Other Metals," Molecules, vol. 24, No. 10, p. 1921, 1-14, (May 18, 2019).

Morrell, Jonathan, "Next-Generation Isotope Production via Deuteron Breakup," dissertation for the degree of Doctor of Philosophy in Engineering, Spring 2021, Nuclear Engineering in the Graduate Division of the University of California, Berkeley, Berkeley, California, United States.

Maj et al., "White Book on the Complementary Scientific Programme at IFMIF-DONES", The Henryk Niewodniczanski Institute of Nuclear Physics Polish Academy of Sciences, Nov. 2016, Krakow, Poland.

Madey et al., "Neutron spectrum at 0 from 83.7 MeV deuterons on beryllium", Sep. 1976, Kent State University, Kent, Ohio.

(56) References Cited

OTHER PUBLICATIONS

Machine translation of Office Action for Japanese Patent Application No. 2021-559746 mailed on Dec. 7, 2023.
"Decision for Rejection" regarding application No. 2021-559746, mailed on Jun. 27, 2024. pp. 1-4.

* cited by examiner

SYSTEMS AND METHODS FOR PRODUCING ACTINIUM-225

RELATED APPLICATIONS

This application claims priority to U.S. Provisional Patent Application No. 62/830,687, filed Apr. 8, 2019, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to systems and methods for producing radionuclides using secondary neutrons from deuteron breakup, and more specifically to systems and methods for producing actinium-225 using secondary neutrons from deuteron breakup.

BACKGROUND

Actinium-225 is a promising radionuclide for use in a new form of cancer treatment referred to as targeted alpha-particle therapy. Actinium-225 has a relatively long half-life (i.e., about 10 days) followed by a quick succession of 4 α-decays capable of producing the sort of double-strand DNA damage needed to deter tumor growth. It produces no long-lived radioactive products in its decay. The relatively long half-life allows for its incorporation in targeting biomolecules.

Actinium-225 has already shown promise for use the treatment of advanced metastatic prostate cancer. For example, in clinical trials, actinium-225 has been attached to PSMA-617 (prostate membrane specific antigen 617), a small molecule designed to bind to a protein found in high levels in the vast majority of prostate cancers. Once it attaches to cancerous cells, the actinium-225 has been shown to release highly targeted doses of radiation that can kill cancerous cells while minimizing damage to surrounding healthy tissues, with remarkable results in patient survival.

There is currently insufficient actinium-225 available to allow for large-scale clinical studies. The isotope is currently produced in very limited quantities from the decay of uranium-233 produced at Oak Ridge National Laboratory as a part of the U.S. Nuclear Weapons Program. The long half-life of uranium-233 (i.e., 159,000 years) makes the production rate of actinium-225 very slow.

One approach to produce actinium-225 to use high-energy (e.g., 100 MeV to 200 MeV and greater) proton-induced spallation of $^{232}$Th. However, this method leads to the co-production of a number of long-lived lanthanide fission products, as well as $^{227}$Ac. $^{227}$Ac has a lifetime of 21.772 years, making it an unwanted contaminant. Many doctors do not want to expose younger cancer patients to actinium-225 doses that contain some actinium-227 because of the possible long-term risk that could be associated with even trace amounts of actinium-227 (e.g., less than about 0.5 percent of the total actinium).

A second approach is to use the $^{226}$Ra(p,2n)$^{225}$Ac reaction. However, this reaction is also challenging since the reactivity of radium necessitates the use of an irregular salt target with a limited thickness. Heating of the target from the proton beam could present a potential contamination hazard.

SUMMARY

Actinium-225 is part of a promising radiopharmaceutical. Described herein are methods to produce the radionuclide actinium-225 that are both efficient and do not co-produce dangerous radioactive impurities that would hinder its use in patients. These methods include irradiating radium-226, which is a naturally occurring isotope, with an energetic neutron beam from thick-target deuteron breakup to form radium-225. Radium-225 in turn decays to actinium-225, which is then chemically separated from the radium-226 for use in production of the radiopharmaceutical.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
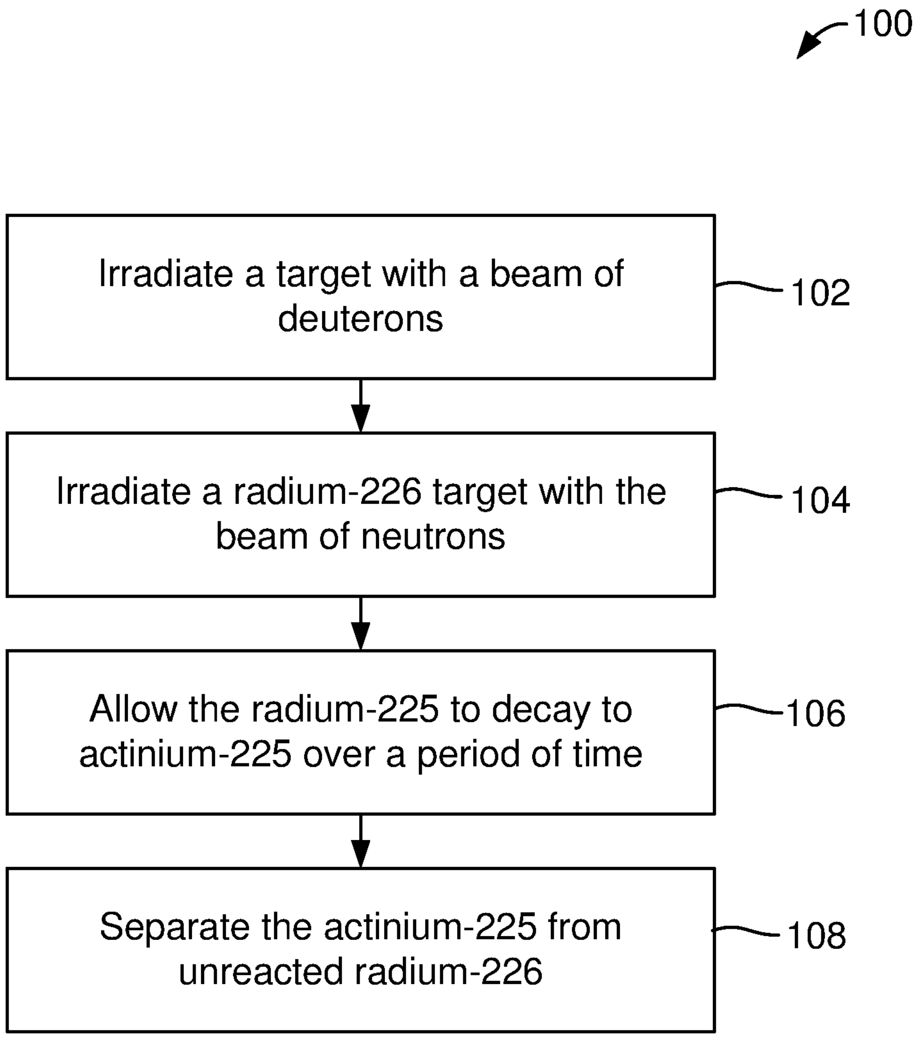
FIG. 1 shows an example of a flow diagram illustrating a process for producing actinium-225.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

The radiochemical purity or radiopurity of actinium-225 produced using the spallation method (described above) will never be above about 99.9%. At this purity level, there is a roughly equal radiation dose from actinium-225 and actinium-227. The radiation dose from actinium-227 could lead to further cancers.

Described herein are methods of producing actinium-225 that is free of contamination from both fission fragments and actinium-227. The fast-neutron method described herein produces actinium-225 having a radiochemical purity of 99.9999% (i.e., three orders of magnitude better than the spallation method). This radiochemical purity of the actinium-225 can be further improved by means of chemical separations (i.e., at least with respect to the actinium-227 contaminant). These production methods could be used by pharmaceutical companies to produce 225-actinium doped prostate-specific membrane antigen-617 (PSMA-617) for use in cancer treatment.

Most medical radionuclides are currently produced using charged particle or low-energy neutron beams. The methods described herein use secondary neutrons from thick-target deuteron breakup to produce radioisotopes. The deuterons can be accelerated using a charged particle accelerator, such as a cyclotron, a Van de Graff accelerator, a pelletron, a radio frequency quadrupole (RFQ) linear accelerator (linac), a tandem linac, or a synchrotron, for example. Generating neutrons in this manner using a charged particle accelerator allows for the focus of most of, a majority of, or all of the neutrons in the same direction at a target (e.g., a radium target), an advantage over reactor-based production techniques. Also, about 95 percent of the generated neutrons pass through the target, so there is the potential to use those neutrons to strike a secondary target.

The disclosed methods of producing $^{225}Ac$ use the $^{226}Ra(n,2n)^{225}Ra$ reaction followed by β-decay of the $^{225}Ra$ into $^{225}Ac$ ($t_{1/2}$=14.9±0.2 days). This approach takes advantage of the lower value of ($Z^2/A$) for radium compared to higher-Z actinides, which leads to a limited fission cross section, and a correspondingly higher (n,2n) cross section for neutron energies up to 20 MeV.

In some embodiments, a method of producing actinium-225 comprises irradiating a target with a beam of deuterons to generate a beam of neutrons, irradiating a radium-226 target with the beam of neutrons to generate radium-225, allowing at least some of the radium-225 to decay to actinium-225 over a period of time, and separating the actinium-225 from unreacted radium-226 and the radium-225.

FIG. 1 shows an example of a flow diagram illustrating a process for producing actinium-225. Starting at block 102 of the method 100 shown in FIG. 1, a target is irradiated with a beam of deuterons to generate a beam of neutrons. In some embodiments, the beam of deuterons is about 1 centimeter (cm) to 5 cm in diameter, about 1 cm to 1.5 cm in diameter, or about 1.5 cm in diameter. In some embodiments, the target comprises a beryllium target. In some embodiments, the beryllium target is about 2 millimeters (mm) to 8 mm thick, or about 3 mm thick. Some advantages of using a beryllium target include beryllium being a relatively inexpensive material, the good mechanical and thermal properties of beryllium, beryllium not becoming radiologically activated with deuteron irradiation, and a high yield of neutrons out per deuteron in with deuteron irradiation. In some embodiments, the target is selected from a group consisting of a beryllium target, a carbon target, a tantalum target, and a gold target.

In some embodiments, the target is disposed proximate the radium-226 target. In some embodiments, the target is positioned about 0.5 millimeters to 1 millimeter from the radium-226 target. In some embodiments, the target is positioned about 0.5 millimeters to 10 millimeters from the radium-226 target. In some embodiments, the target is positioned about 10 millimeters from the radium-226 target. In some embodiments, the target and the radium-226 target are not in contact.

In some embodiments, the target is held in a water-cooled fixture. Power (e.g., about 100 Watts to 300 Watts) is deposited in the target when the target is irradiated with deuterons. This power causes the target to heat up. The water-cooled fixture can cool the target.

In some embodiments, deuterons in the beam of deuterons have an energy of about 25 megaelectron volts (MeV) to 55 MeV, or about 33 MeV. In some embodiments, the beam of deuterons is generated using a charged particle accelerator (e.g., a cyclotron). In some embodiments, the beam of neutrons has a flux of about 1×10^10 neutrons/cm2/sec to 3×10^12 neutrons/cm2/sec. In some embodiments, neutrons in the beam of neutrons have an energy of about 10 MeV or greater.

In some embodiments, an about 10 micro-A to 1 milli-A beam of deuterons having an energy of about 33 MeV irradiates a beryllium target. This generates a beam of neutrons having a flux of about 1×10^10 neutrons/cm2/sec to 1×10^12 neutrons/cm2/sec. The flux of the neutron beam is dependent on the incident energy and the intensity of the deuteron beam. Generally, the higher the incident energy of the beam of deuterons, the higher the flux of the beam of neutrons. The average energy of neutrons in the beam of neutrons is about half of the energy of the beam or deuterons, or about 17 MeV.

In some embodiments, an about 10 micro-A to 1 milli-A beam of deuterons having an energy of about 50 MeV irradiates a beryllium target. This generates a beam of neutrons having an intensity that is about three times as intense as the beam of neutrons generated with the about 33 MeV deuterons, or about 3×10^10 neutrons/cm2/sec to 3×10^12 neutrons/cm2/sec. The average energy of the beam of neutrons is about half of the energy of the beam or deuterons, or about 25 MeV.

In some embodiments, the neutrons are not thermal neutrons generated in a nuclear reactor. In some embodiments, the neutrons are not generated by a spallation source. Thermal neutrons are generally considered to be neutrons with an energy of less than about 10 kiloelectron volts (keV). Thermal neutrons have an average energy of about 25 millielectron volts (meV). A large percentage (e.g., about 95% to 99%) of the neutrons generated with a cyclotron in the methods described herein are considered to be fast neutrons, or neutrons with an energy about 1 MeV and higher.

In some embodiments, an initial diameter of the beam of neutrons (i.e., a diameter of the neutron beam being emitted from the target) is about the diameter of the beam of deuterons, or about 1 cm to 5 cm in diameter, about 1 cm to 1.5 cm in diameter, or about 1.5 cm in diameter.

Figure 5:
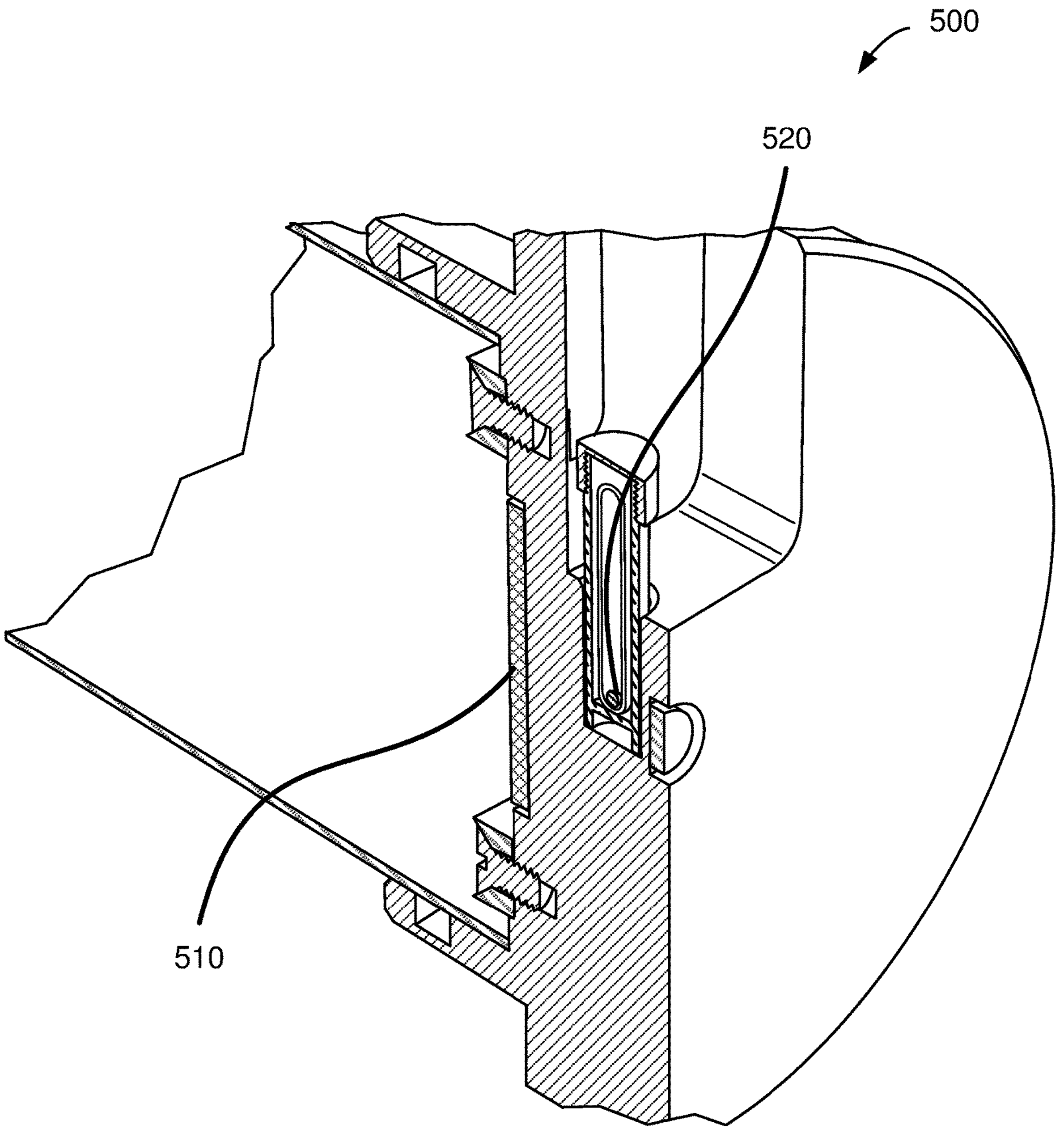
FIG. 5 shows an example of a schematic diagram of the fixture used to perform the methods described herein with the 88-Inch Cyclotron at Lawrence Berkeley National Laboratory (LBNL).
Figure 6:
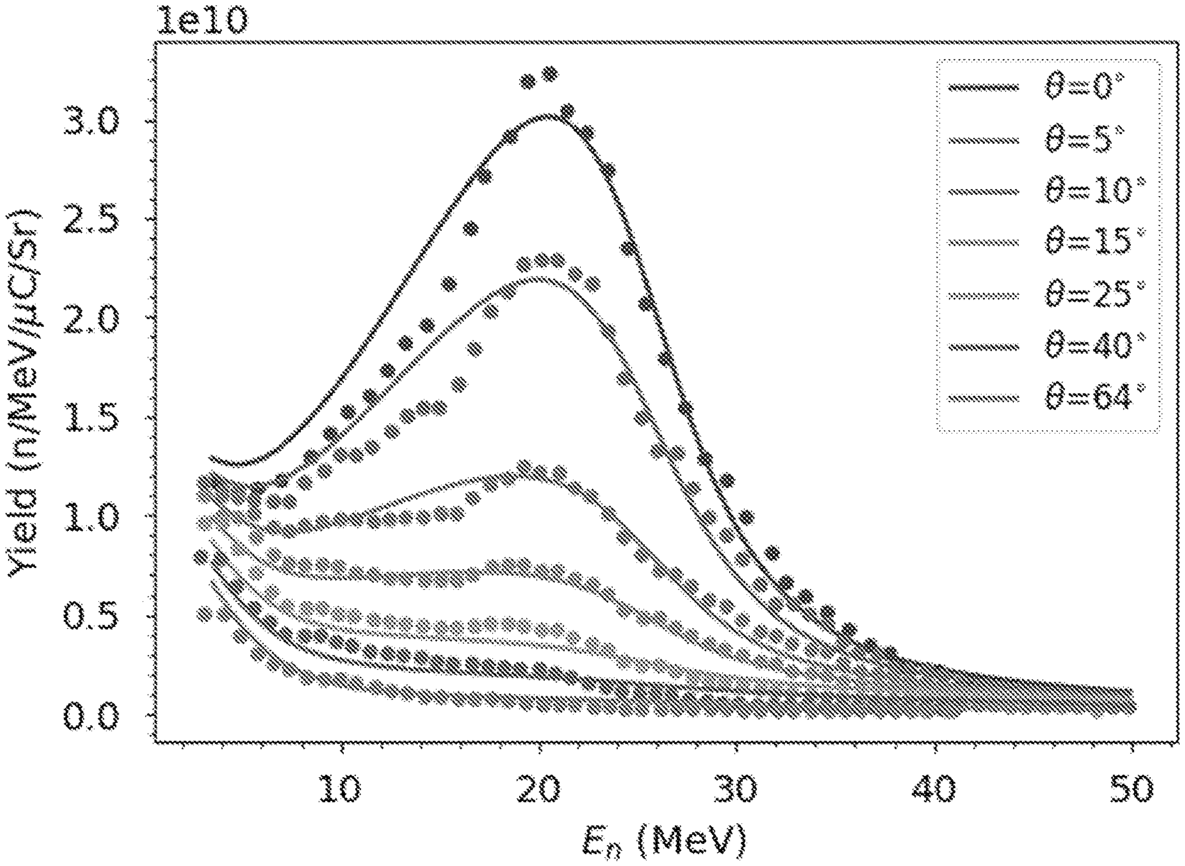
FIG. 6 shows an example of a graph of the neutron emission spectrum generated by the 88-Inch Cyclotron for 50 MeV deuterons.

The beam of neutrons is considered to be a forward-focused beam of neutrons, and not neutrons being emitted isotropically from a source. FIG. 5 shows an example of a graph of the percentage of neutrons in the neutron beam versus the emission angle. 0 degrees is a neutron that is emitted in the same direction as a deuteron in the beam of deuteron beam. As can be seen in FIG. 6, about 90% of the neutrons generated are focused (e.g., directionally focused) in a direction almost parallel to the deuteron beam.

Turning back to FIG. 1, at block 104, a radium-226 target is irradiated with the beam of neutrons to generate radium-225. Radium-226 is a radioactive isotope of radium. In some embodiments, the radium-226 target reacts to form the radium-225 by a (n, 2n) reaction. In some embodiments, the radium-226 target is not positioned in a nuclear reactor. In some embodiments, the radium-226 target is irradiated with the beam of neutrons for a time period of at least 1 day. In some embodiments, the radium-226 target is about 1 mm to 10 mm thick.

In some embodiments, the radium-226 target comprises a radium-226 salt. Radium-226 salts include radium nitrate ($Ra(NO_3)_2$). In some embodiments, the radium-226 salt target has a mass of about 1 milligram (mg). For larger scale production of actinium-225, the radium-226 salt target may have a mass of about 100 mg to 1 gram (g), or about 100 mg to 10 g.

Irradiating the radium-226 target with the beam of neutrons may generate radium-227. Radium-227 beta-decays to actinium-227. In the experiments described in the Examples below, the generation of actinium-227 due to irradiating radium-226 with a beam of neutrons has not been observed. In some embodiments, irradiating the radium-226 target with the beam of neutrons does not generate any actinium-227 or any species that decays to actinium-227.

At block 106, at least some of the radium-225 is allowed to decay to actinium-225 over a period of time. In some embodiments, the radium-225 decays to actinium-225 by beta decay. In some embodiments, the generation of actinium-225 by beta decay of radium-225 is what avoids the generation of actinium-227 and leads to the high purity of the generated actinium-225. In some embodiments, the period of time is at least about 30 days or about 30 days. In some embodiments, the period of time is at least about 15 days or about 15 days In some embodiments, when actinium-227 is present or may be present in the radium-226 target, about 1 hour to 5 hours, or about 2 hours, after the radium-226 target is irradiated with neutrons, a chemical process is used to separate actinium from the radium. This actinium is disposed of, as this actinium will contain most of or all of the actinium-227 produced from beta-decay as a result of the irradiation. Following this chemical separation, all subsequent actinium collected from this irradiation will be actinium-225 because radium-225 has a much longer half-life than radium-227. As a result, most of the actinium-225 will still be available for separation without the actinium-227 contaminant. Then, at least some of the radium-225 decays to actinium-225 over a period of time.

Turning back to FIG. 1, at block 108, the actinium-225 is separated from unreacted radium-226 and the radium-225. In some embodiments, the actinium-225 is separated from unreacted radium-226 and the radium-225 using a chemical separation process. In some embodiments, after the separating the actinium-225 from unreacted radium-226 and the radium-225, the actinium-225 does not include any actinium-227. In some embodiments, after the separating the actinium-225 from unreacted radium-226 and the radium-225, the actinium-225 consists essentially of actinium-225. Further details regarding the methods for separation of actinium-225 from radium-226 and radium-225 can be found in U.S. patent application Ser. No. 16/329,178 filed Feb. 27, 2019, U.S. patent application Ser. No. 16/365,132 filed Mar. 26, 2019, and U.S. patent application Ser. No. 16/336,665 filed Mar. 26, 2019, all of which are herein incorporated by reference.

In some embodiments, prior to irradiating the radium-226 target with the beam of neutrons, the radium-226 target is cleaned to remove any radium-228 and any thorium-228 from the radium-226 target. This cleaning may be performed with a chemical process. Removing radium-228 and thorium-228 from the target prevents actinium-228 from forming and keeps actinium-228 out of the actinium-225 that is generated.

Figure 2:
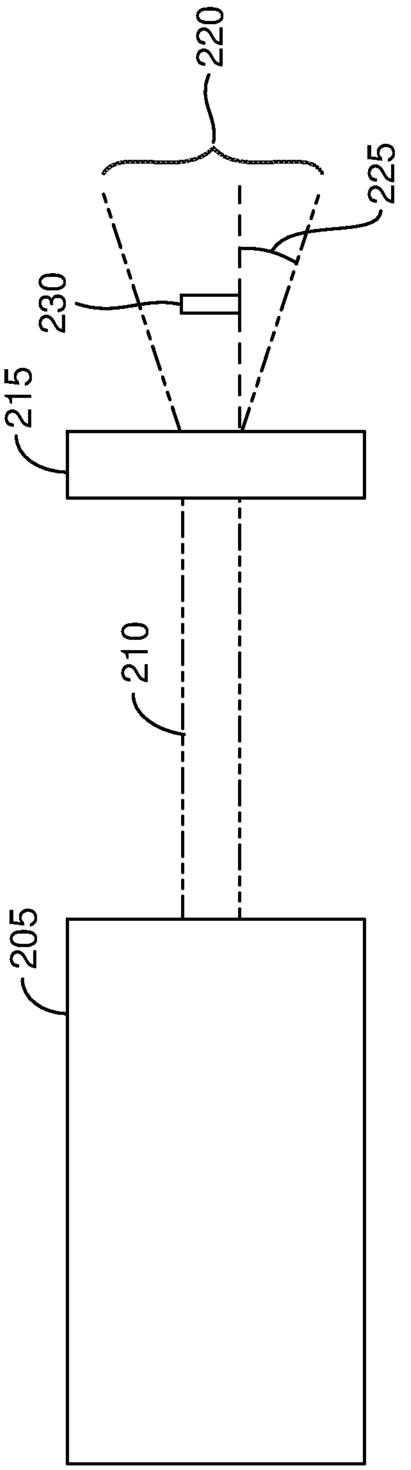
FIG. 2 shows an example of a schematic diagram of a setup to perform the methods described herein.

FIG. 2 shows an example of a schematic diagram of a setup to perform the methods described herein. As shown in FIG. 2, a charged particle accelerator 205 generates a beam of deuterons 210. The beam of deuterons 210 irradiate or impinge on a deuteron target 215 (e.g., a target of beryllium) to generate a beam of neutrons 220. The beam of neutrons 220 has spread of an angle 225 of about 5 degrees. About 90% of the neutrons generated from the deuteron target 215 are within the cone having the spread of about 5 degrees. The beam of neutrons 220 irradiates a radium-226 target 230.

In some embodiments, prior to irradiating the beryllium target with the beam of deuterons, the beam of deuterons passes through an iridium target or a strontium target. In some embodiments, the iridium target or the strontium target is less than about 1 millimeter thick. Passing deuterons through an iridium-193 target produces the platinum-193m radioisotope by a (d,2n reaction). Passing deuterons through a strontium-86 target produces the yttrium-86 radioisotope by a (d,2n reaction).

Irradiating other targets with secondary neutrons from deuteron breakup can be used to produce other radioisotopes. For example, a zinc target (i.e., zinc-64 and zinc-67) irradiated with neutrons would produce copper-64 and copper-67. Other radioisotopes that could be produced include astatine-211, bismuth-213, gallium-68, thorium-229, and lead-212. Yet further radioisotopes that could be produced are listed below in Table 1, including the isotope to be irradiated and the reaction to form the radioisotope.

TABLE 1

Radionuclide production pathways.

| | Major decay Gamma-ray Energy and Intensity | |
|---|---|---|
| Reaction | keV | % |
| $^{193}Ir(d,2n)^{193m}Pt$ | 133.50 (3) | 0.115 |
| $^{86}Sr(d,2n)^{86}Y$ | 1076.63 (10) | 82.5 |
| $^{64}Zn(n,p)^{64}Cu$ | 511 | 35.2 (4) |
| $^{67}Zn(n,p)^{67}Cu$ | 184.577 (10) | 48.7 (3) |
| $^{47}Ti(n,p)^{47}Sc$ | 159.381 (15) | 68.3 (4) |
| $^{177}Hf(n,p)^{177}Lu$ | 208.3662 (4) | 10.36 (7) |
| $^{181}Ta(n,\alpha n)^{177}Lu$ | 208.3662 (4) | 10.36 (7) |
| $^{100}Mo(n,2n)^{99}Mo \rightarrow$ $^{99m}Tc$ (β-decay) | 140.511 | 89 (4) |
| $^{32}S(n,p)^{32}P$ | — | — |
| $^{226}Ra(n,2n)^{225}Ra \rightarrow$ | 218.0 (1) | 11.44 |
| $^{225}Ac$ (β-decay) | 440.45 (1) | 25.94 (15) |

Figure 3:
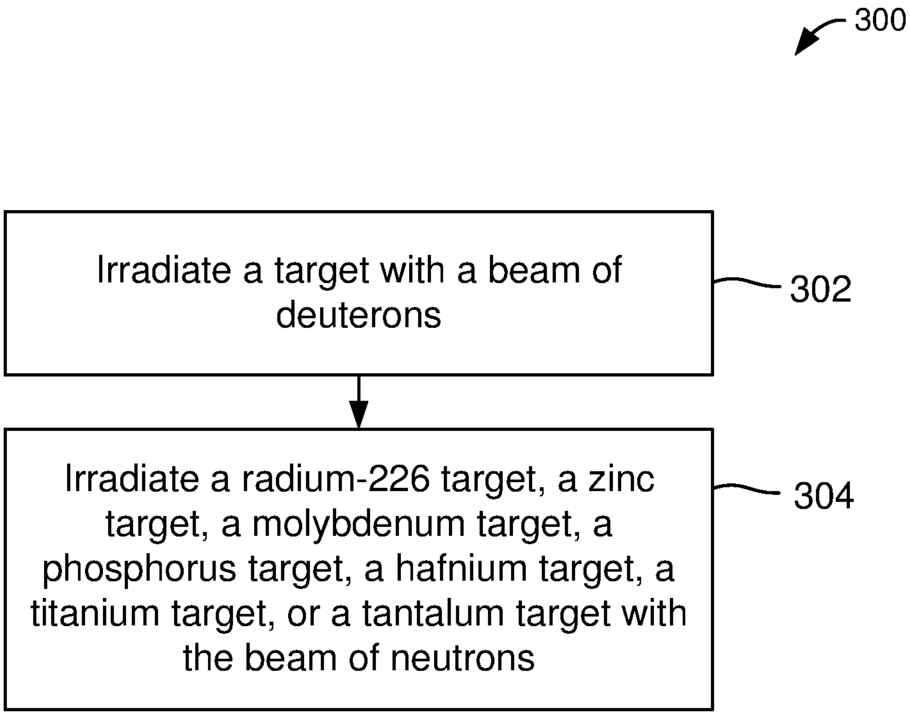
FIG. 3 shows an example of a flow diagram illustrating a process for producing a radionuclide.

FIG. 3 shows an example of a flow diagram illustrating a process for producing a radionuclide. At block 302 of the method 300 shown in FIG. 3, a target is irradiated with a beam of deuterons to generate a beam of neutrons. At block 304, a target selected from a group of targets consisting of a radium-226 target, a zinc target, a molybdenum target, a phosphorus target, a hafnium target, a titanium target, and a tantalum target is irradiated with the beam of neutrons.

Figure 4:
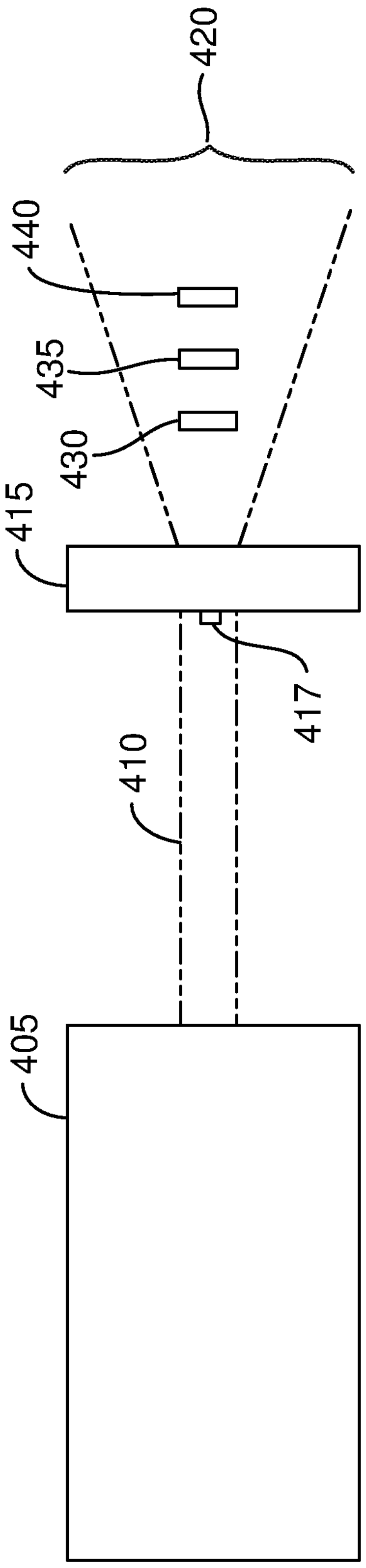
FIG. 4 shows an example of a schematic diagram of a setup to perform the methods described herein.

FIG. 4 shows an example of a schematic diagram of a setup to perform the methods described herein. As shown in FIG. 4, a charged particle accelerator 405 generates a beam of deuterons 410. The beam of deuterons 410 irradiate or impinge on a first target 417 before irradiating or impinging a deuteron target 415 (e.g., a target or beryllium) to generate a beam of neutrons 420. In some embodiments, the first target 417 comprises iridium-193 or strontium-86. In some embodiments, the first target 417 is about 25 microns to 500 microns thick. The beam of neutrons 420 irradiates a plurality of targets. Shown in FIG. 4 are second target 430, a third target 435, and a fourth target 440. More targets could be included. In some embodiments, the targets 430, 435, and 440 are each about 0.1 mm to 0.5 mm thick, or about 0.1 mm to 1 mm thick.

The neutrons pass do not lose much energy passing through a single target and most of the neutrons in the beam of neutrons do not interact with a single target. The majority of neutrons pass through most matter with no interactions. For a target that the neutrons impinge on, a very thick target could be used (e.g., up to about 10 cm thick), a plurality of target materials as shown in FIG. 4 could be used (e.g., up to about 10 cm thick, depending on the density of the material of the targets), or combinations thereof.

The following examples are intended to be examples of the embodiments disclosed herein, and are not intended to be limiting.

EXAMPLE

In the Examples described herein, the 88-Inch Cyclotron at Lawrence Berkeley National Laboratory (LBNL) was used to generate a beam a deuterons. Deuterium is one of the two stable isotopes of hydrogen. The nucleus of deuterium, called a deuteron, contains one proton and one neutron.

The 88-Inch Cyclotron (the "88") at LBNL is a variable energy, high-current, multi-particle cyclotron capable of accelerating ions ranging from protons to uranium at energies approaching and exceeding the Coulomb barrier. Maximum currents on the order of 10 particle•μamperes, with a beam power limitation of 1.5 kW, can be extracted from the machine for use in experiments in seven experimental "caves". Intense light-ion beams, including deuterons, can be used in both the cyclotron vault and Cave 0.

FIG. 5 shows an example of a schematic diagram of the fixture used to perform the methods described herein with the 88-Inch Cyclotron at LBNL. As shown in FIG. 5, a fixture 500 holds a beryllium target 510 and a target 520 (e.g., a radium-226 target). A beam of deuterons accelerated by the cyclotron irradiates the beryllium target 510. This generates a beam of neutrons (i.e., a beam of secondary neutrons) that irradiates the target 520.

FIG. 6 shows an example of a graph of the neutron emission spectrum generated by the 88-Inch Cyclotron for 50 MeV deuterons. The points in the graph are data, and the solid lines are the theoretical predictions.

The following method was used to produce actinium-225. First, a highly focused beam of energetic secondary neutrons was produced by accelerating a deuterium ion beam onto a thick beryllium target. The deuteron beam was produced using the LBNL 88-Inch Cyclotron.

Second, this beam of secondary neutrons was made incident on a sample of radium-226, which has a half-life of 1600 years and is found in nature in uranium ores. This resulted in the production of the radium-225, which has a half-life of 14.9 days. This irradiation period would typically take place over one or more days. Since neutrons have extremely long ranges in matter as compared to protons, the radium-226 target can be very thick, leading to a high-production rate of radium-225.

Third, over a period of several tens of days, a portion of the radium-225 decayed to actinium-225.

Fourth, the actinium-225 was separated from the radium-226 for use in the medical applications. The unreacted radium-226 is returned for use in subsequent irradiations using secondary neutrons.

The production rate of actinium-225 when 33 MeV deuterons are used to irradiate a beryllium target is about 2.1 mCi per milli-Amp-hour of deuteron beam per gram of radium-226 (2.1 mCi/mAh/g). For a 0.1 mA beam of deuterons, the production rate of actinium is about 0.21 mCi/hour/gram, or about 5.04 mCi/day/gram.

Below is a table with the experimental parameters and results of two separate runs of the 88-Inch Cyclotron to generate actinium-225.

| | run 1 | | run 2 | |
|---|---|---|---|---|
| Produced actinium-225 | 1.46 | uCi | 0.67 | uCi |
| DGA actinium-225 | 1.27 | uCi | 0.274 | uCi |
| AG50 actinium-225 | — | | 0.296 | uCi |
| Initial radium | 0.846 | mCi | 0.976 | mCi |
| DGA radium | 50.3 | nCi | — | |
| AG50 radium | — | | 899 | nCi |
| Total fluence | 3.67e+16 | n | 2.78e+16 | n |
| Average neutron energy | 11.87 | MeV | 14.62 | MeV |
| Average 226Ra(n,2n) xs | 835.9 | mb | 624.9 | mb |
| Integral current | 701.9 | uAh | 326.8 | uAh |
| Average current | 3.89 | uA | 3.68 | uA |
| Irradiation time | 7.51 | d | 3.69 | d |

DGA - diglycolamide (N,N,N',N'-tetrakis-2-ethylhexyldiglycolamide)
AG50 - analytical grade cation exchange resin (Bio-Rad Laboratories, Inc., Hercules, CA)

The numbers for DGA actinium-225/AG50 actinium-225 are the activities that were recovered after chemical separation, and the numbers for DGA radium/AG50 radium are the activities of the contaminating radium-226. The radium-226 would presumably be diminished by additional chemical separation steps. For example, each separation increases the actinium-225/radium-226 ratio by about 10^4, whereas each separation reduces the actinium-225 concentration by only about 10%.

Note that there was less actinium-225 produced/recovered in run 2 than in run 1. Even when accounting for the differences in the neutron fluence, deuteron beam current, radium-226 cross-section, initial masses of radium-226, and the production/decay terms, there was still an approximately 30% lower production rate in run 2 than in run 1. This could be due to the beam spot alignment/focus of the deuteron beam, as the deuteron-breakup reaction is extremely forward focused. Simulations have not yet been performed to confirm this discrepancy, however.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:

irradiating a target with a beam of deuterons to generate a beam of neutrons traveling in a direction parallel with a direction of the beam of deuterons, wherein the target comprises a beryllium target that is 4 millimeters to 8 millimeters thick;

irradiating a radium-226 target with the beam of neutrons to generate radium-225, wherein the beam of neutrons has a flux of $1\times10^{10}$ neutrons/cm$^2$/sec to $3\times10^{12}$ neutrons/cm$^2$/sec;

waiting a period of time to allow at least some of the radium-225 to decay to actinium-225 by beta decay; and separating, from unreacted radium-226 and the radium-225, the actinium-225.

2. The method of claim 1, wherein the radium-226 reacts to form the radium-225 by a (n, 2n) reaction.

3. The method of claim 1, wherein the period of time is 15 days.

4. The method of claim 1, wherein after the separating, the actinium-225 does not include any actinium-227.

5. The method of claim 1, wherein after the separating, the actinium-225 consists essentially of actinium-225.

6. The method of claim 1, wherein irradiating the radium-226 target occurs over a period of time of at least 1 day.

7. The method of claim 1, wherein the target is disposed proximate the radium-226 target.

8. The method of claim 1, wherein the target is positioned 0.5 millimeters to 10 millimeters from the radium-226 target.

9. The method of claim 1, wherein the target and the radium-226 target are not in contact.

10. The method of claim 1, wherein the radium-226 target is 1 millimeter to 10 millimeters thick.

11. The method of claim 1, wherein deuterons in the beam of deuterons have an energy of 25 MeV to 55 MeV.

12. The method of claim 1, wherein irradiating the radium-226 target with the beam of neutrons does not generate any actinium-227 or any species that decays to actinium-227.

13. The method of claim 1, wherein the beam of deuterons is generated using a cyclotron.

14. The method of claim 1, wherein the radium-226 target is not positioned in a nuclear reactor.

15. The method of claim 1, wherein the neutrons are not thermal neutrons generated in a nuclear reactor.

16. The method of claim 1, wherein the neutrons are not generated by a spallation source.

17. The method of claim 1, wherein the beam of neutrons irradiates one or more additional radionuclide targets placed downstream of the radium-226 target with respect to the direction of the beam of neutrons.

18. A method comprising:

irradiating a target with a beam of deuterons to generate a beam of neutrons traveling in a direction parallel with a direction of the beam of deuterons, the beam of neutrons having a flux of $1\times10^{10}$ neutrons/cm$^2$/sec to $3\times10^{12}$ neutrons/cm$^2$/sec and neutrons in the beam of neutrons have an energy of 10 MeV or greater, wherein the target comprises a beryllium target that is 4 millimeters to 8 millimeters thick;

irradiating a radium-226 target with the beam of neutrons to generate radium-225;

waiting a period of time to allow at least some of the radium-225 to decay to actinium-225 by beta decay; and separating, from unreacted radium-226 and the radium-225, the actinium-225.

19. The method of claim 18, wherein the beam of neutrons irradiates one or more additional radionuclide targets placed downstream of the radium-226 target with respect to the direction of the beam of neutrons.

* * * * *